United States Patent [19]
Prior

[11] Patent Number: 4,728,402
[45] Date of Patent: Mar. 1, 1988

[54] ELECTROLYTIC SILVER REFINING PROCESS

[75] Inventor: Adalbert Prior, Gerolfingen-Biel, Switzerland

[73] Assignee: Ogussa Osterreichische Gold- und Silber-Scheideanstalt Scheid und Roessler GeSellschaft m.b.H. & Co. K.G., Vienna, Austria

[21] Appl. No.: 887,420

[22] Filed: Jul. 17, 1986

[30] Foreign Application Priority Data

Jul. 24, 1985 [AT] Austria ................................ 2196/85

[51] Int. Cl.$^4$ ............................................. C25C 1/12
[52] U.S. Cl. .................................. 204/109; 204/106; 204/130; 204/257; 204/263; 75/101 BE; 423/24
[58] Field of Search ................................ 204/109–111, 204/263, 257, 106, 130; 423/24; 75/101 BE

[56] References Cited

U.S. PATENT DOCUMENTS

| | | | |
|---|---|---|---|
| 2,723,229 | 11/1955 | Bodamer | 204/263 |
| 3,224,873 | 12/1965 | Swanson | 75/101 |
| 3,975,244 | 8/1976 | Hunter | 204/108 |
| 4,212,714 | 7/1980 | Coker et al. | 204/263 |
| 4,443,305 | 4/1984 | Haynes | 204/109 |

Primary Examiner—R. L. Andrews
Attorney, Agent, or Firm—Seidel, Gonda, Goldhammer & Abbott

[57] ABSTRACT

An electrolytic silver refining process in which crude silver is anodically dissolved and refined silver is cathodically deposited and at the same time accompanying metals are selectively extracted from the spent electrolyte and separately cathodically deposited after having been transferred into an aqueous phase and the regenerated electrolyte stripped of accompanying metals is recycled to the refining process and in which further the spent electrolyte is anodically enriched in silver and accompanying metals are cathodically deposited from the aqueous phase in a joint electrolysis step. The invention resides in that the joint electrolysis step is carried out in a diaphragm cell in which a diffusion zone is provided between one each cathode and one each anode and separated from the anode zone by an anionic separating membrane and from the cathode zone by a cationic separating membrane and that the diaphragm cell is charged via the diffusion zone with accompanying metal extract, of preferably controlled acid content, and that the apparatus for carrying out said process is preferably provided with an acid trap through which the accompanying metal extract flowsk in particular a diffusion dialyzer, which is arranged before the inlet of the accompanying metal extract into the diaphragm cell.

6 Claims, 1 Drawing Figure

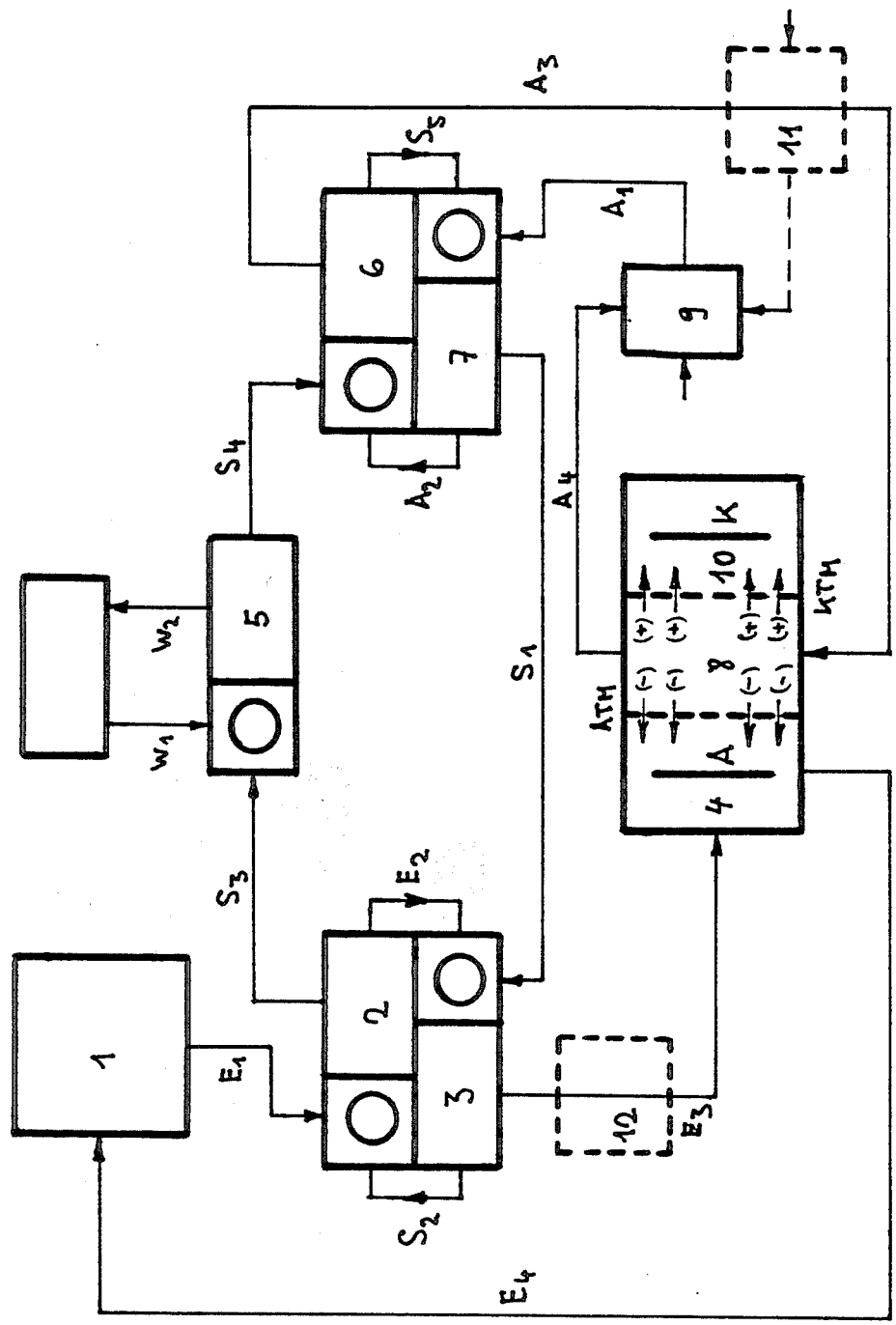

ELECTROLYTIC SILVER REFINING PROCESS

The invention relates to an electrolytic silver refining process in which crude silver is anodically dissolved and refined silver is cathodically deposited and at the same time accompanying metals are selectively extracted from the spent electrolyte and separately cathodically deposited after having been transferred into an aqueous phase, and the regenerated electrolyte stripped of accompanying metals is recycled to the refining process and in which further the spent electrolyte is anodically enriched in silver and accompanying metals are cathodically deposited from the aqueous phase in a joint electrolysis operation, the extraction step(s) optionally being provided in the form of a liquid membrane permeation, preferably in combination with solvent extraction.

An electrolytic silver refining process in which crude silver is anodically dissolved and refined silver is cathodically deposited and at the same time accompanying metals are selectively extracted from the spent electrolyte and separately cathodically deposited after having been transferred into an aqueous phase and the regenerated electrolyte stripped of accompanying metals is recycled to the silver electrolysis is known and a process of this type with an installation is described, for instance, in Swiss Patent Specification No. 614,238.

In electrolytic silver refining, which is normally carried out according to the Moebius or Balbach/Thum processes, the more common accompanying metals present in the crude anodic silver, such as copper, constitute an essential burden to the process because they are dissolved and accumulate in the electrolyte. In conventional silver nitrate baths, Cu content of about 60 g/1 is considered as the maximum admissible value; above this, a cathodic copper deposition may occur, but at least the refined silver occludes Cu salts so that the requirements as to fineness are no longer complied with. The spent electrolyte must thus periodically be regenerated or replaced from time to time.

Electrolyte recycling was already employed in this respect, the spent electrolyte was withdrawn from the refining cell, Cu was extracted therefrom and the thus regenerated electrolyte depleted in Cu was recycled to the refining cell. The extracted Cu was transferred into an aqueous phase and cathodically deposited separately. A large number of organic reactants are known as selective extractants for Cu; so, for instance, the known process described above works on the principle of solvent extraction with chelating agents such as phenone oximes or quinolines. The spent electrolyte is extracted in mixer/settler installations and the Cu is stripped from the organic extract phase by means of an acidic stripping solution. The enriched stripping solution is electrolyzed, Cu and optionally Ni as well may be cathodically deposited. Depending on the chelating agent and the operating conditions, it is possible to extract accompanying metals more or less selectively. The organic phase (solvent+extractant) is washed. The organic phase, the stripping solution regenerated by electrolysis and the regenerated electrolyte are recycled.

Due to the simultaneous dissolution of Cu and Ag at the anode, more Ag is deposited at the cathode than dissolved at the anode. For this reason, the electrolyte is depleted in silver and it is necessary to add pure silver nitrate (as a solution) to the regenerated electrolyte as compensation. This constitutes a burden to the process because pure silver nitrate is an expensive product.

In order to provide a process of the type initially mentioned in which a continuous complete regeneration of the electrolyte is effected and in which the silver deficiency is compensated without the addition of silver nitrate solution, it was proposed to anodically enrich the spent electrolyte in silver and cathodically deposit accompanying metals from the aqueous phase by a joint electrolysis operation, with a liquid membrane permeation, preferably combined with solvent extraction, optionally provided as extraction step(s).

For this purpose, the apparatus for carrying out the process is provided with at least one refining cell, with at least one eletrolysis cell for the cathodic deposition of the accompanying metals and at least one extraction means for extracting the accompanying metals from the spent electrolyte and for transferring the extracted accompanying metals into an aqueous phase and with at least one joint electrolysis cell, preferably a diaphragm cell with an anionic diaphragm, for enriching the spent electrolyte in silver and cathodically depositing the accompanying metals.

In the joint electrolysis cell, Ag is anodically dissolved, preferably by means of a crude silver anode, as the content in accompanying metals only needs to be reduced and not completely eliminated. The electric current liberated at the cathode during the cathodic deposition of the accompanying metals enhances the dissolution of the silver anodes.

It is the function of the anionic diaphragm to prevent silver from entering the cathode zone where it would be re-deposited together with the accompanying metals and to convey the $NO_3$ ions required for the formation of $AgNO_3$ into the anode zone.

By an appropriate selection of the extractants for the accompanying metals, of which chelating agents have proved to be most selective, it is possible to prevent the co-extraction of silver to the extent that the electrolytic re-enriching of the spent refining electrolyte with silver can be carried out even before the extraction of the accompanying metals.

The extraction of the accompanying metals is normally a solvent extraction wherein first the spent refining electrolyte is treated with a solvent/extractant phase which is subsequently stripped by means of an $(NO_3^-)$ stripping solution of ion parity.

It was found, however, that advantages can be obtained in the extraction of accompanying metals other than Cu, particularly of Pb, platinum metals such as Pd or Pt, Ni, W, Zn and Cd, if the extraction process employed is liquid membrane permeation, possibly a combination of solvent extraction and liquid membrane permeation.

In this, the solvent/extractant phase serves as a separating membrane between the spent refining electrolyte and an acidic stripping solution which is emulsified in the separating membrane. After the transition (permeation) of the accompanying metal(s) from the refining electrolyte into the organic emulsion phase, the emulsion phase is separated and disintegrated in a manner known per se to form an aqueous phase (enriched stripping solution) and an organic phase (solvent/extractant). The enriched stripping solution is again regenerated by means of subsequent electrolysis of accompanying metals or separation of valuable materials without electrolysis and emulsified in the organic phase again. In this case, the organic phase merely serves as a selective separating medium between the aqueous phases (spent refining electrolyte and stripping solution) so that it does not have to absorb the accompanying metal(s) such as in liquid/liquid extraction. This results in a clearly reduced solvent consumption and high enrichment rates such as in the range of e.g. 1:100.

It was found that the proposal according to Swiss Patent Specification No. 614,238 to re-extract the organic extract phase enriched in accompanying metals by means of a sulfuric acid stripping solution technologically inconvenient because the stripped organic solvent/extractant phase must be washed free of sulfate ions prior to its recycling into the extraction step in order not to contaminate the refining electrolyte (nitric acid solution).

As a result, it was proposed to conveniently work exclusively with solutions of ion parity, in particular nitric acid solutions, in stripping as well, so that this problem would not arise, in particular the operation of the joint electrolysis cell for the cathodic deposition of accompanying metals and for the anodic enrichment in silver would remain troublefree.

On the other hand, however, this meant putting up with the fact that since copper, for instance, is in practice electrolytically depositable in favorable form virtually from sulfuric acid solutions only, the deposition of copper from the nitric acid medium is not optimal.

It was further found that in the process proposed, a certain silver slip occurs in the diaphragm cell so that the cathodically deposited copper is doped with silver.

It was thus the object of the invention to eliminate these disadvantages by carrying out the joint electrolysis operation in which the spent electrolyte is anodically enriched in silver, on the one hand, and the re-extracted accompanying metals, in particular copper, are cathodically deposited from the aqueous phase, on the other hand, in such a way that the cathodic operations are completely independent of the anodic operations.

This object is achieved according to the invention in that the joint electrolysis operation is carried out in a diaphragm cell wherein a diffusion zone is provided between one each cathode and anode, which diffusion zone is separated from the anode zone by an anionic separating membrane and from the cathode zone by a cationic separating membrane, with the diaphragm cell being charged with accompanying metal extract, preferably of controlled acid content, via the diffusion zone.

This allows, a.o., to provide a sulfuric acid medium instead of a nitric acid medium in the cathode zone and thus optimally deposit the copper and to prevent any silver slip to the cathode so that the copper deposited is free of silver.

In this, the re-extracted, strongly nitric acidic copper solution i.e. the stripping solution enriched in Cu, is fed into the diffusion zone of the diaphragm cell which is called membrane cell or membrane electrolysis cell in the following. From the diffusion zone, the copper cations migrate into the cathode zone through the cation exchanger membrane, on the one hand, and the nitrate anions into the anode zone through the anion exchanger membrane, on the other hand, so that the copper is deposited on the cathode from sulfuric acid solution and silver is dissolved as silver nitrate on the anode. The anion exchanger membrane prevents the diffusion of the silver ions and the cation exchanger membrane prevents the diffusion of the sulfate ions into the diffusion zone.

The stripping solution depleted in copper is withdrawn from the diffusion zone of the membrane cell and recycled to the re-extractor (stripper) after adjustment of its acid content.

Depending on the plotted operation of the membrane cell, high acid concentration differences between anode and cathode zone can have a more or less negative effect. In order to prevent these disadvantages, it is further proposed according to the invention to control the acid content of the solution of accompanying metals fed into the membrane cell. This is conveniently effected by interposing an acid trap, in particular a diffusion dialyzer, between stripper and membrane cell. Diffusion dialyzers are known systems which by means of commercially available exchanger membranes concertedly release acid from acidic salines into water flowing in counter-current. In this way, fluctuations in the system can be compensated and the stripping operation may be done at very high acid concentrations; the membrane cell is operated in the manner most convenient for the respective case.

The process according to the invention is explained in the following by means of examples under reference to the accompanying drawing representing a flow chart of an apparatus according to the invention for carrying out the process.

From the refining cell 1, the electrolyte $E_1$ which is spent, i.e. deficient in silver and enriched in copper, passes into a two-step extraction mixer 2, 3 where it is extracted in counter-current by means of a Cu-selective extractant by liquid/liquid extraction (solvent extraction).

Suitable solvent extractants for copper are e.g. cation exchangers such as versatic acid (synthetic carboxylic acid mixture of highly branched isomers of $C_{10}$ monocarboxylic acids of mainly tertiary structure; commercial product e.g. Versatic 911) and HDEHP (bis-(-2-ethylhexyl)-phosphoric acid) as well as chelating agents such as oximes of the formula

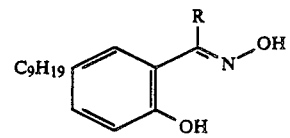

the chelating agents being more selective for Cu, while Ag is always co-extracted with the cation exchangers mentioned.

The following commercial products are mentioned as examples for chelating agents containing oximes of the above formula:

SME 529 (contains oxime with $R=CH_3$)
LIX 64N (contains oxime with $R=C_6H_5$ and oxime of the formula

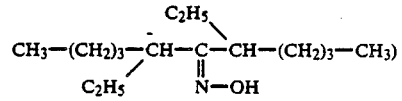

ACORGA Pt 5050 (contains oxime with $R=H$, tridecanol and kerosene)

The spent electrolyte and the once-enriched solvent extractant $S_2$ are introduced into the mixer of the first extraction unit 2, the regenerated solvent extractant $S_1$ and the electrolyte $E_2$ once depleted in copper are charged into the mixer of the second extraction unit 3.

From the settler of the second extraction unit 3, the electrolyte $E_3$ twice depleted in copper is fed into the anode zone 4 of a membrane electrolysis cell 4, 8, 10 where it is enriched in $AgNO_3$ by the electrolytic dissolution of a silver anode in nitric acid solution and then recycled to the refining cell 1 as a regenerated electrolyte $E_4$.

From the settler of the first extraction unit 2, the doubly enriched solvent extractant $S_3$ passes into the mixer of a scrubber-extractor 5 where the co-extracted silver is eliminated by means of washing with copper nitrate solution $W_1$. The washing solution $W_2$ enriched in silver is withdrawn from the settler of the scrubber-extractor 5 and further processed in the usual manner; the solvent extractant $S_4$ depleted in silver is re-extracted in a two-step re-extraction mixer 6, 7, i.e. washed (stripped) free of copper in the counter-current by means of aqueous nitric acid. The solvent extractant $S_4$ to be stripped and the stripping acid $A_2$ once enriched in copper are fed into the mixer of the first reextraction unit 6 and the fresh (regenerated) stripping acid $A_1$ and the solvent extractant $S_5$ once depleted in copper are fed into the mixer of the second re-extraction unit 7.

From the settler of the second re-extraction unit 7, the solvent extractant $S_1$ twice depleted in copper and thus regenerated is recycled into the mixer of the first extraction unit 3 for closing the cycle; from the settler of the first re-extraction unit 6, the stripping solution $A_3$ doubly enriched in copper passes into the diffusion zone 8 of the membrane electrolysis cell 4, 8, 10 in which silver is anodically dissolved and copper is cathodically deposited, as a strongly acid copper nitrate solution. Nitrate anions are released from the stripping solution $A_3$ into the anode zone 4 via the anion exchanger membrane ATM and correspondingly copper cations are released into the cathode zone 10 where a sulfuric acid medium dominates, via the cation exchanger membrane KTM.

The stripping solution $A_4$ depleted in copper and nitrate ions in this way is withdrawn into a mixing container 9 where the acid content is completed with nitric acid and then recycled as a regenerated (fresh) stripping acid $A_1$ to the mixer of the second re-extraction unit 7 for closing the cycle.

The apparatus can be provided with a diffusion dialyzer 11 arranged between the re-extractor (stripper) group 6,7 and the membrane electrolysis cell 4, 8, 10. The dialyzer 11 uses water to wash out nitric acid, which is passed directly into the mixing tank 9, from the stripping solution $A_3$. This permits the adjustment of the acid concentration in the stripping solution $A_3$ on entering into the membrane electrolysis cell to the respective optimal value.

As already proposed, it is further possible to extract further accompanying metals, in particular Cd, Ni, Pd, Pt, Bi and/or W, from the spent electrolyte after the Cu-separation, but prior to the enrichment in silver. For this purpose, the drawing schematically shows a further extraction unit 12 between the settler of the second extraction unit 3 and the anode zone of the membrane electrolysis cell 4, 8, 10 in the path of the electrolyte $E_3$ doubly depleted in copper.

It is also possible to extract accompanying metals together with the copper and then separate them by means of selective stripping.

As already proposed, it is also possible to enrich the spent electrolyte in silver first and then deplete it in copper instead of depleting it in copper first. This way of proceeding presupposes the use of a chelating agent as the solvent extractant in order to prevent the useless carrying along of silver.

The anion and cation exchanger membranes used in the membrane electrolysis cell 4, 8, 10 and the diffusion dialyzer are commercially available and are offered by various firms with graded performance spectrum.

I claim:

1. In a process for regenerating a used electrolyte from a Moebius or Balbach/Thum silver refining process in which used electrolyte is regenerated in a joint electrolysis step by cathodically removing contaminants and anodically dissolving silver therein, the improvement which comprises charging extracted metal contaminants to the membrane electrolysis cell in a diffusion zone provided between each cathode and anode of the cell, said diffusion zone being separated from the anode zone by an anionic separating membrane and from the cathode zone by a cationic separating membrane.

2. The improvement according to claim 1 wherein the extract of the metal contaminants is of controlled acid content.

3. The improvement according to claim 1 wherein the electrolyte is extracted by liquid membrane permeation before the extract is charged into the diffusion zone of the membrane electrolysis cell.

4. The improvement according to claim 3 wherein the liquid membrane permeation is combined with solvent extraction.

5. In an apparatus for electrolytic silver refining by the Moebius or Balbach/Thum process having at least one joint electrolysis cell in the form of a membrane electrolysis cell for anodically enriching the spent electrolyte in silver and cathodically depositing accompanying metals, the improvement comprising that the membrane electrolysis cell is provided with a diffusion zone between each cathode and anode for receiving an extract containing metal contaminants, which diffusion zone is separated from the anode zone by an anionic separating membrane and from the cathode zone by a cationic separating membrane.

6. The apparatus according to claim 5 wherein an acid trap through which the extract containing contaminants flows is provided before the inlet of the extract into the membrane electrolysis cell.

* * * * *